United States Patent [19]

Schmidt

[11] Patent Number: 5,570,127
[45] Date of Patent: Oct. 29, 1996

[54] VIDEO RECORDING SYSTEM FOR PASSENGER VEHICLE

[76] Inventor: William P. Schmidt, 20950 Woodruff, Rockwood, Mich. 48173

[21] Appl. No.: 330,976

[22] Filed: Oct. 28, 1994

[51] Int. Cl.$^6$ .................................................. H04N 5/225
[52] U.S. Cl. ........................... 348/148; 348/151; 340/433
[58] Field of Search .................................. 348/148, 149, 348/143, 151, 159; 340/433

[56] References Cited

U.S. PATENT DOCUMENTS

| | | | |
|---|---|---|---|
| 3,739,703 | 6/1973 | Behles | 348/151 X |
| 3,916,097 | 10/1975 | Imai | 348/151 |
| 4,217,606 | 8/1980 | Nordmann | 348/151 |
| 4,943,864 | 7/1990 | Elberbaum | 348/159 |
| 5,027,200 | 6/1991 | Petrossian et al. | 348/149 X |
| 5,289,321 | 2/1994 | Secor | 348/149 X |
| 5,319,394 | 6/1994 | Dukek | 348/148 |
| 5,382,953 | 1/1995 | Hauptli | 340/433 |

OTHER PUBLICATIONS

School Bus Video Camera Catches Passbys In The Act, *School Transportation News*, Aug. 1994.

Primary Examiner—Wendy Garber
Attorney, Agent, or Firm—Weintraub, DuRoss & Brady

[57] ABSTRACT

A passenger vehicle video recording system for recording passengers on a passenger vehicle as well as passing traffic. The preferred embodiment of the passenger vehicle video recording system includes two video cameras wherein one video camera is mounted to the rearview mirror of the passenger vehicle and the other camera is mounted to the side of the vehicle. The system additionally includes a video recorder, the video recorder located inside the passenger vehicle. A switching signal determines which of the two video cameras is in communication with the video recorder so as to view passengers on the passenger vehicle and passing traffic.

4 Claims, 3 Drawing Sheets

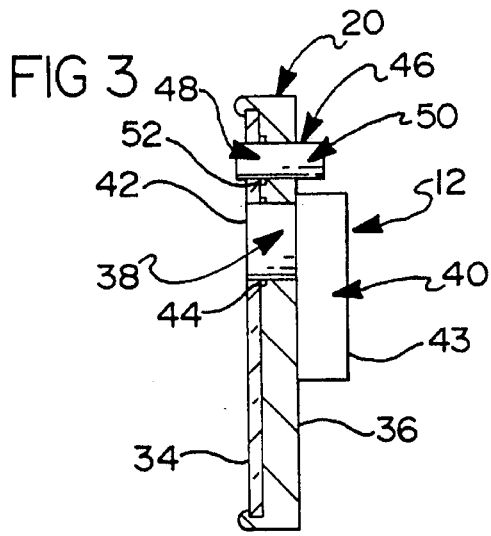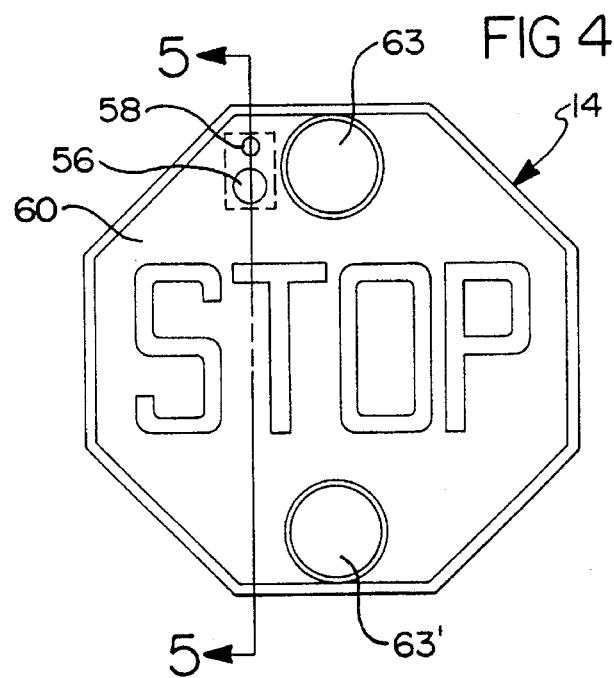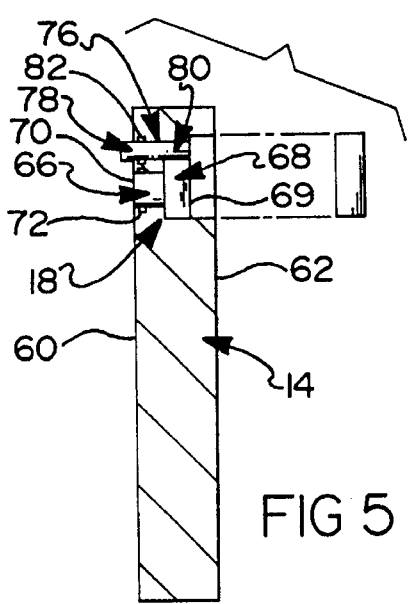

5,570,127

VIDEO RECORDING SYSTEM FOR PASSENGER VEHICLE

BACKGROUND OF THE INVENTION

I. Field of the Invention

The present invention relates, generally, to video recording systems. More particularly, the present invention relates to a video recording system for use in a passenger carrying vehicle and, even more particularly, for use in a school bus.

II. Description of the Prior Art

Passenger vehicles, such as a school bus, can present a very dangerous environment for its passengers. Generally, a single bus driver is placed in charge of all the students riding the bus. The bus driver is not only burdened with the job of safely driving the bus, but also managing students riding to and from school.

Because school bus drivers cannot continuously watch the students, they frequently act inappropriately without the bus driver taking notice or without the ability to do anything about it. For example, students often place themselves in danger by standing up while the bus is in motion, throwing various items, etc. Concomitantly, students are exposed to the danger of passing traffic every time they board and exit a school bus.

Currently equipped school buses have large red lights prominently displayed exteriorly at the front and rear of the bus. When students are boarding or exiting the bus, the bus driver activates a switch, causing the lights to blink on and off. By law, in most jurisdictions, motorists are required to stop and wait until the bus driver turns off the flashing lights, ensuring the students' safety. Unfortunately, motorists often fail to notice the flashing stop lights or simply ignore them and drive past the school bus while students are boarding or exiting. Bus drivers are in no position to record license plates or descriptions of vehicles passing the bus while it is stopped to load or unload students, so motorists continue breaking the law with very little chance of being caught. Bus drivers simply cannot effectively carry out three jobs at once; i.e. drive the bus, manage the students and record the license plate numbers of motorists who pass the bus while it is loading or unloading students.

Thus, it is to be appreciated that a cost effective means for deterring students' inappropriate behavior and motorists' unlawful behavior is needed.

SUMMARY OF THE INVENTION

The present invention provides a passenger vehicle video recording system comprising:

(a) at least one video camera attached to a passenger vehicle for viewing passengers within the vehicle and for viewing traffic approaching and passing the vehicle, the video camera comprising:
   (1) a lens;
   (2) means for generating video signals representing an image received through the lens;
   (3) means for outputting video signals;
(b) a video recorder located inside the passenger vehicle, the video recorder having a video signal input port; and
(c) means for connecting the means for outputting video signals of the at least one video camera to the video signal input port of the video recorder.

The preferred embodiment of the present invention, as implemented in a school bus, includes two video cameras. One camera is mounted to the outside of the bus, being attached at the driver's side of the bus. The other camera is attached inside the bus and is mounted to the rear view mirror. The camera located outside the bus views an area where traffic approaches and passes the bus. The camera located inside the bus views the passenger compartment therein. Each of the cameras is connected to a switching mechanism that relays video signals from one of the cameras to a video recorder located inside the bus. The switching mechanism is connected to each of the cameras and to the video recorder. When the flashing light system of the bus is an activated video signals representing images captured by the camera mounted to the exterior of the bus are relayed to the video recorder. When the flashing lights are deactivated, video signals representing images captured by the camera mounted inside the school bus are relayed to the video recorder.

The present invention will be more clearly understood with reference to the accompanying drawings. Throughout the various figures, like reference numerals refer to like parts in which:

BRIEF DESCRIPTION OF THE DRAWINGS

FIG. 3 is a cross-sectional view of the mirror, taken along the line 3—3 of FIG. 2;

FIG. 4 is a view of the external mounting box, assembly and camera of the preferred embodiment;

FIG. 5 is a front view of an extendable stop sign having a video camera mounted thereon in accordance with the present invention;

DETAILED DESCRIPTION OF THE PREFERRED EMBODIMENT

Figure 1:
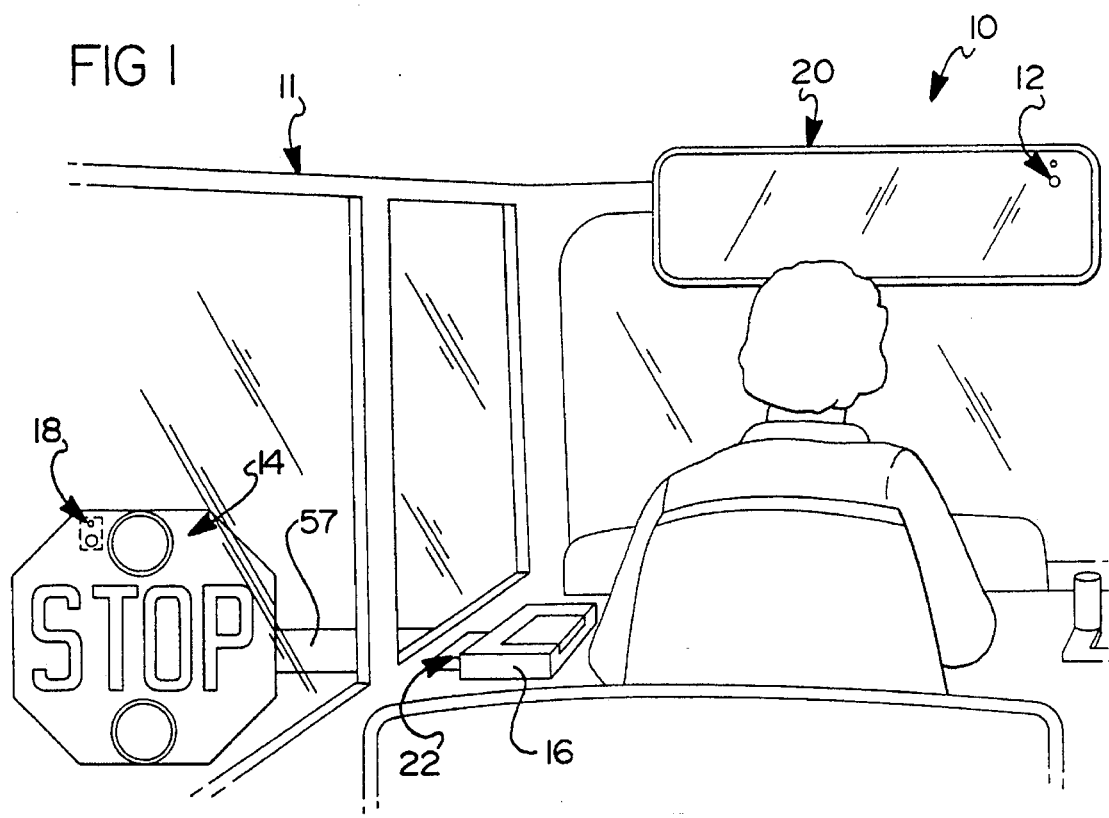
FIG. 1 is an environmental plan view depicting the preferred embodiment of the passenger vehicle video recording system as implemented in a school bus.

Referring now to FIG. 1, there is shown a preferred embodiment of the present invention, to wit, a passenger vehicle video recording system shown generally at 10 and optimally, deployed in conjunction with a school bus 11. The system 10 generally comprises a first camera 12 mounted to a vehicular rearview mirror 20, a video recording device 16, a second camera 18 externally mounted to the school bus 11 at the driver's side and a video signal relay device 22. The bus 11 includes stop lights 14 that flash on and off when activated by the bus driver. These stop lights 14 indicate to passing vehicles that students are loading onto or unloading off of the bus 11 and that the vehicle should stop until the flashing stop lights 14 are deactivated. The flashing stop lights 14 may be positioned at the front and rear of the bus 11 as well as on the side of the bus 11.

Figure 2:
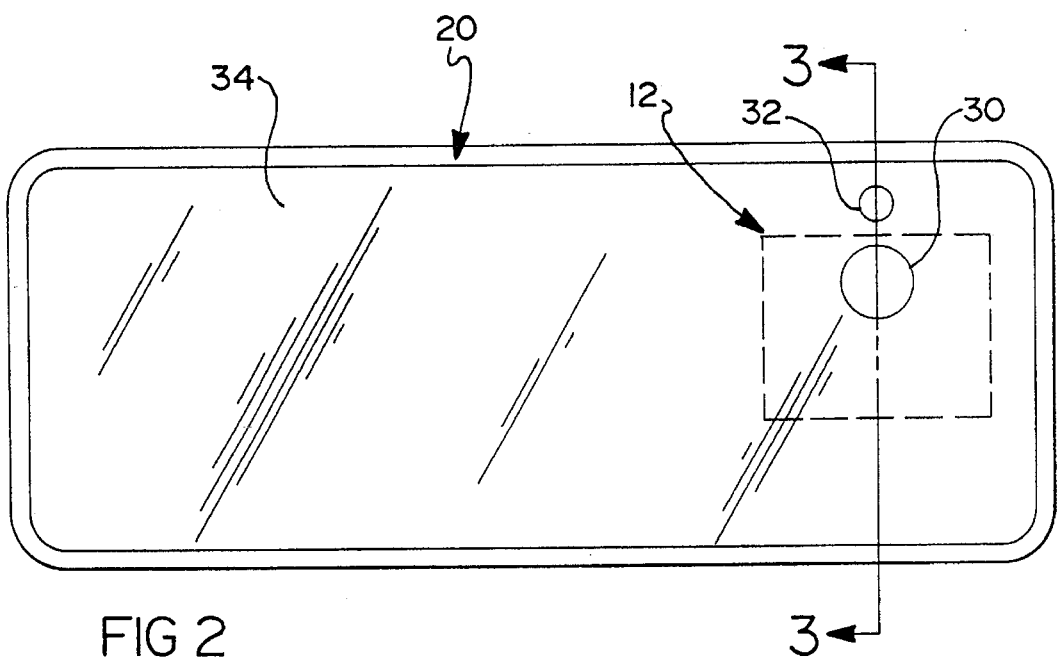
FIG. 2 is a front view of a mirror having a video camera mounted thereon in accordance with the present invention.

As depicted in FIGS. 2 and 3, the rearview mirror 20, is shown as a rectangular, flat mirror, but may also be any type of rearview mirror known to the skilled artisan. The mirror 20 includes a first aperture 30, a second aperture 32, a front surface 34, and a rear reflective surface 36.

The first video camera 12 is mounted to the rearview mirror 20 at its rear reflective surface 36 by a mounting bracket, glue, or other mounting means known to the skilled artisan. The first video camera 12 has a front portion 38 and a rear portion 40. The front portion 38 of the first camera 12 includes a camera lens 42. The rear portion 40 of the first camera 12 includes a means for generating video signals representing an image received through the lens. Such means for generating video signals indicative of an image received through a lens are well known to the skilled artisan and come as part of currently produced video cameras. Additionally, the rear portion 40 includes means 43 for outputting the video signals. Such means for outputting video signals are well known to the skilled artisan, such as an output port, wiring, output plug or other similar means.

The first video camera 12 is preferably enclosed in a housing 45 which fits about the camera and is mounted to the rear surface 36 of the mirror using mounting brackets, screws, welding or other conventional mounting mirrors. In this way, passengers do not know that there is a camera mounted to the mirror.

The front portion 38 of the first camera 12 slidably fits into the first aperture 30 of the rearview mirror 20. A gasket 44 securely fits about the periphery of the front portion 38 of the first camera 12 to seal the opening between the first aperture 30 and the front portion 38 of the first camera 12. Also, the gasket 44 provides for vibration dampening between the mirror 20 and the front portion 38 of the first camera 12. This helps to steady the front portion 38 of the first video camera 12 as the passenger vehicle travels over different types of terrain. The lens 42 of the first video camera 12 is trained on the passenger compartment of the passenger vehicle for capturing images therein. Additionally, the lens 42 is flush with the front surface 34 of the rearview 20 protecting and reducing any additional vibrations of the lens.

Alternatively, the first camera may be mounted to the rear reflective surface 36 of the mirror 20 so that the lens 42 is flush with the rear reflective surface 36. The lens is able to view the passenger compartment because no reflective surface is applied or included where the lens meets the mirror. The reflective surface has been purposely left off in that area so that the lens 42 may view through the mirror.

A first light emitting diode 46 has a front portion 48 and a rear portion 50. The first light emitting diode 46 is mounted to the mirror 20 using a mounting bracket, glue, or other mounting means well known to the skilled artisan. The light emitting diode 46 slidably fits in the second aperture 32 of the rearview mirror 20. A second gasket 52 securely fits about the periphery of the front portion 48 of the first light emitting diode 46. The second gasket 52 secures the first light emitting diode 46 within the second aperture 32 of the rearview mirror 20. Further, the second gasket 52 seals the opening between the second aperture 32 of the rearview mirror 20 and the periphery of the front portion 48 of the first light emitting diode 46.

The first light emitting diode 46 is electrically connected to the first video camera 12 and is lit when the first video camera 12 is active. Means for electrically connecting a light emitting diode to a video camera are well known to the skilled artisan, such as wire, coaxial cable or other electrical connection means known to the skilled artisan. Students riding the bus can see the first light emitting diode 46 and know the first camera 12 is active when the first light emitting diode 46 is lit.

Referring now to FIG. 4, the second video camera 18 and a mounting box 100 are Shown. The mounting box 100 is constructed of metal, or other suitably durable, stong material. Additionally, the mounting box 100 is preferably mounted exteriorly the bus 11 at the driver's side by the driver's window 13. The mounting box 100 is integrally formed with a mounting plate 101 which may be made of the same material as the mounting box 100. Means for mounting the mounting box 100 and mounting plate 101 to the exterior of the bus 11 includes welding, rivets, screws, or any other means will known to the skilled artisan.

The mounting box 100 is preferably positioned behind and below the driver's window 13, providing the best possible view of passing traffic. It is to be appreciated that the mounting box 100 may be attached on the other side of the bus 11, or that two mounting boxes may be attached to the outside of the bus 11, one on each side of the bus 11.

As depicted in FIG. 4, the mounting box 100 houses and protects the second camera 18. The mounting box has a front surface 102 which has an aperture 104 formed therein. The second camera 18 has a lens 106, preferably a wide-angle lens, for capturing images of vehicles passing the bus 11. The lens 106 fits in the aperture 104 formed in the front surface 102 of the mounting box 100. A gasket 108 fits about the periphery of the lens 106 and seals the space between the lens 106 and the front surface 102 within which it lies. The gasket 100 provides vibration dampening between mounting box 100 and the second camera 18 which helps stablize the camera as the bus 11 passes over different types of terrain.

The front surface 102 of the mounting box 100 is rearwardly angled so as to provide the camera lens, which lies flush with the front surface 102 an appropriate view of vehicles passing the bus 11.

The second video camera 18 includes means for generating video signals 108 representing an image received through the lens 106. Such means 108 are quite well known to the skilled artisan. Additionally, the second video camera includes means 110 for outputting the video signals.

Figure 7:
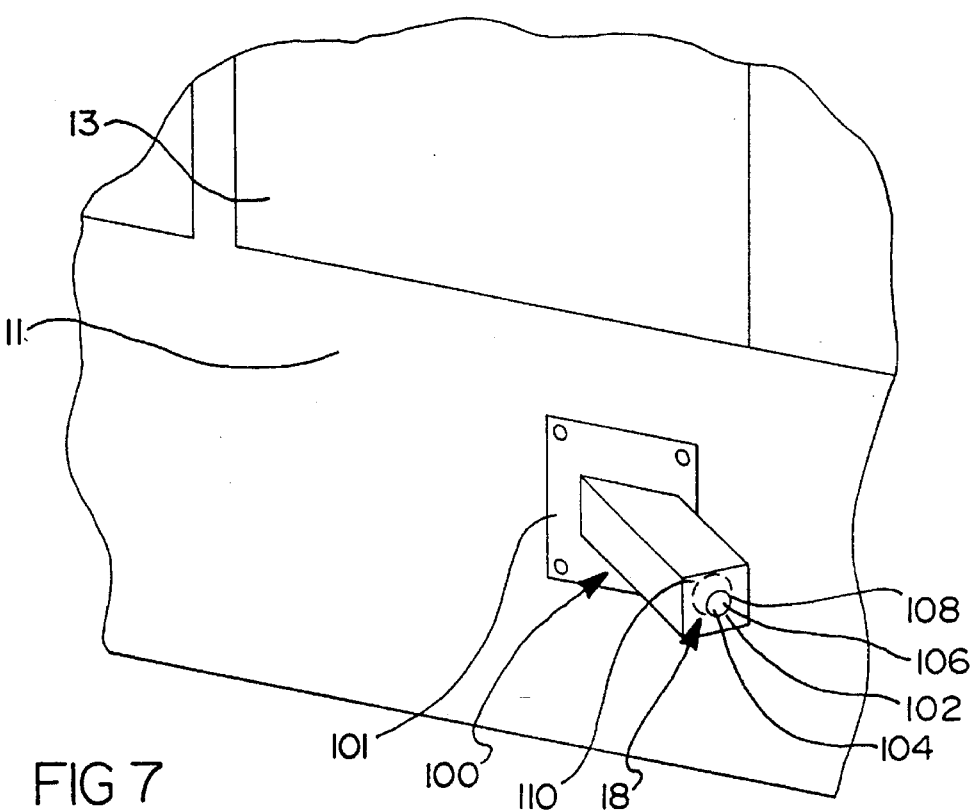
FIG. 7 is a top view of the video signal relay device in accordance with the present invention.

Included in the preferred embodiment and as depicted in FIG. 7, the present invention includes a selective video signal relay device 22 in conjunction with the video recorder 16. The selective video signal relay device 22, includes a pair of video signal input ports 84, 84', and output plug 86 and a switching signal input port 88. Each of the pair of video signal input ports 84, 84' is electrically connected to a corresponding means for outputting video signals 43, 110 of the first video camera 12 and the second video camera 18. The selective video signal relay device 22 functions by relaying only one of the two video signals received at the video signal input ports 84' 84' to the output plug 86, depending upon a switching signal received at the switching signal input port 88. The means for switching disposed within the selective video signal relay device 22 may be accomplished by integrated circuit technology, relay circuitry or other relay means, all of which are well known to the skilled artisan.

The output plug 86 of the video signal relay device 22 is electrically connected to the video recording device 16 at video input port 17 of the video recording device 16. In the preferred embodiment, the video recording device 16 and both cameras 12, 18 are activated when the vehicle is started. This can be accomplished by connecting the video recording device 16 and the cameras 12, 18 to the electrical system (not shown) of the passenger vehicle. Alternatively, the video recording device 16 and video cameras 12, 18 may be battery powered. Means for connecting loads, such as a video recorder and video cameras, to a passenger vehicle's electrical system are well known to the skilled artisan including wiring and coaxial cabling and will not be further discussed herein. The video recording device 16 records the images relayed from one of the two acting cameras in accordance with a switching signal received at its switching signal input port 88. Video recording devices having video input ports are well known to the skilled artisan and are produced by a myriad of companies.

In another embodiments, the video signal relay device may have three or more video signal input ports for receiving signals from a corresponding number of video cameras placed about the passenger vehicle. According hereto, the switching means would function to as many states as there are cameras.

The selective video signal relay device 22 generally functions in response to a switching signal. In the preferred embodiment, the switching signal will have only two states; one state indicating that the flashing stop lights 14 are activated; the other state indicating that the flashing stop lights 14 are deactivated.

When the flashing stop lights 14 are activated, the selective signal relay device 22 receives a corresponding switching signal and relays the video signals received from the second video camera 18 to the input port 17 of the video recording device 16. If the flashing stop lights 14 are deactivated, the video signal relay device 22 receives a different switching signal and, accordingly, relays the video signals received from the first video camera 12 to the input port of the video recording device 16.

Although the selective video signal relay device 22 is pictured as having input ports 84, 84' and 88, any means for receiving electrical signals could be used including direct wiring between the video recorder 16 and the video signal relay device 22 or other means known to the skilled artisan.

The switching signal received at the input port 88 of the selective video signal relay device 22 may be produced by any of a multitude of well known means including, but not limited to, pulse width modulation, step voltages, or multiplexed signals, all of which are known to the skilled artisan.

The means for producing the switching signal may function jointly with the means for activating the flashing stop lights 14. The flashing stop lights 14 may be activated by pushing a button (not shown) located near the driver's seat of the passenger vehicle. When the push button or other suitable means for activating the flashing stop lights 14 is activated, a corresponding switching signal is sent to the switching signal input port 88. The signal may be produced by the same circuit that relays power to the flashing stop lights 14 or from another source such as directly from the battery of the vehicle (not shown).

In normal operation, the video recorder 16 records the images received from the first video camera 12, as relayed by the video signal relay device 22. When the driver of the passenger vehicle activates the flashing stop lights 14, the selective video signal relay device 22 receives a different switching signal and accordingly relays the video signals from the second video camera 18 to the video recorder 16.

Although not shown, it is to be understood that the present invention may comprise a single video camera having a lens, means for generating video signals representing an image received through the lens and means for outputting video signals, as well as a video recording device having a video signal input port. The means for outputting video signals of the single video camera is connected to the input port of the video recorder. Such means for connecting include optical cabling, coaxial cabling or wiring, all of which are well known to the skilled artisan.

The single video camera is located interiorly of the passenger vehicle and is attached to a wall of the vehicle by a mounting bracket or the like (not shown). The camera views the passenger compartment of the vehicle and an area exterior the vehicle where vehicles approach and pass the vehicle.

The means for outputting video signals of the video camera is directly connected to the video input port of the video recording device and both are activated when the passenger vehicle is started. Both the video camera and the video recorder may be electrically connected to the electrical system of the passenger vehicle so as to activate upon starting the vehicle.

Figure 6:
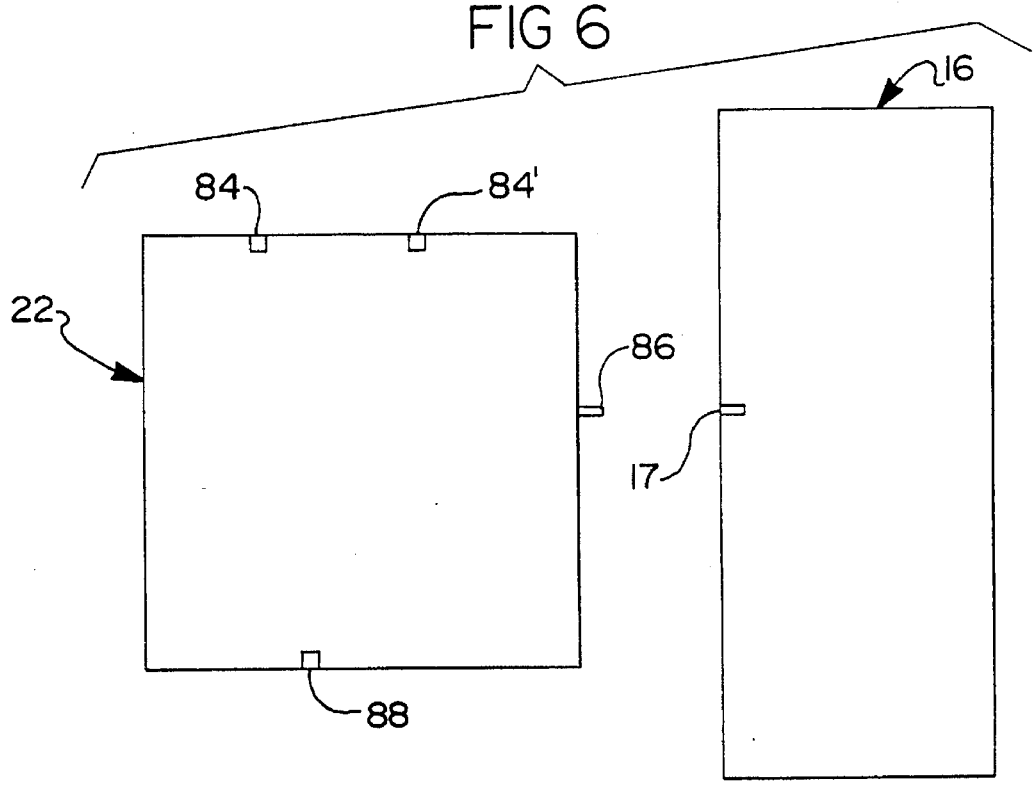
FIG. 6 is a cross-sectional view of the stop sign taken along the line 5—5 of FIG. 5.

Alternatively, referring to FIGS. 1,5 and 6, a modification to the preferred embodiment provides a second camera 112 in an extendable and retractable stop sign 114 mounted to the vehicle 11. The extendable stop sign 114 is mounted to an arm 57 which is extensibly mounted exteriorly the school bus 11. Means for mounting the extendable stop sign 114 to the arm 57 includes brackets, screws or other mounting means known to the skills artisan. The extendable stop sign 114 has a retracted configuration where it is parallel and abutting the exterior of the school bus 11 and an extended configuration where it is substantially normal to and extended from the school bus 11. The extendable stop sign 114 may be extended and retracted by several means including electrically driven motors or manually operable spring loaded means, both of which are well known to the skilled artisan. The means for extending and retracting the extendable stop sign may be activated by the driver by pressing a button or by moving a handle, or ther similar switching mechanisms (not shown).

As shown, the sign 114 has a first aperture 56, a second aperture 58 located above the first aperture, a front surface 60, a rear surface 62 and two flashing stop lights 114.

The second video camera 112 has a front portion 66 and a rear portion 68. The front portion 66 includes a camera lens 70. The rear portion includes means for generating video signals representing an image received through the lens. Such means are well known to the skilled artisan. Additionally, the rear portion 68 includes a means for outputting video signals 69. Such means for outputting video signals are well known to the skilled artisan.

The front portion 66 of the second video camera 112 slidably fits into the first aperture 56 formed through the extendable stop sign 114. The lens 70 of the second video camera 112 lies flush with the front surface 60 of the extendable stop sign 114 protecting the lens 70 from debris. A gasket 72 snugly fits about the front portion 66 of the second video camera 112 and seals the opening between the first aperture 56 of the extendable stop sign 114 and the periphery of the front portion 66 of the second video camera 112 which helps stabilize the front portion 66 of the second video camera 112 as the bus 11 passes over different types of terrain. The lens 70 of the second video camera 112 is trained on an area exterior the bus 11 where traffic approaches and passes the bus 11, generally on the driver's side of the bus 11.

A second light emitting diode 76 includes a front portion 78 and a rear portion 80. The second light emitting diode 76 is mounted to the extendable stop sign 114 via a mounting bracket, glue or other well known mounting means and, further, is slidably housed within the second aperture 58 of the extendable stop sign 114. A gasket 82 snugly fits about the periphery of the second light emitting diode 76. The gasket 82 seals the opening between the second aperture 58 of the extendable stop sign 114 and the periphery of the second light emitting diode 76. The gasket 82 further provides vibration dampening for the second light emitting diode 76 extending the life of the second light emitting diode 76.

The second light emitting diode 76 is electrically connected to the second video camera 112 so that the second light emitting diode 76 is lit whenever the second video camera 112 is operating. Such means for electrically connecting a video camera to a light emitting diode are well known to the skilled artisan and include cabling, wires or other known electrical connection means.

Accordingly, the present invention provides a cost effective way to video record passengers within a vehicle and approaching and passing vehicles. This system can be implemented in any passenger vehicle, but has special application in buses, more specifically, school buses. The present invention additionally provides a recording means to capture students breaking school rules while on the school bus.

The present invention serves not only to video tape students acting inappropriately and motorists breaking the law, it is a cost effective means for deterring such behavior.

As will be realized, the invention is capable of other and different embodiments and its several details are capable of modifications in various obvious respects, all without departing from the invention. Accordingly, the drawings and descriptions are to be regarded as illustrative in nature and not as restrictive.

Having, thus, described the present invention, what is claimed is:

1. A vehicular video recording system comprising:
   (a) a plurality of video cameras attached to a passenger vehicle, the vehicle having an exterior surface and an interiors, each of the plurality of video cameras comprising:
      (1) a lens;
      (2) means for generating video signals representing an image received through the lens;
      (3) means for outputting video signals;
   (b) a video recorder located in a passenger vehicle interior, the recorder having a video input port;
   (c) means for connecting the means for outputting video signals of each of the plurality of video cameras to the video input port of the video recorder;
   (d) a rearview mirror comprising:
      (1) a front surface;
      (2) a rear surface;
      (3) at least one aperture formed through the mirror;
   wherein one of the plurality of video cameras is mounted to the rearview mirror at its rear surface, the lens of the camera being disposed adjacent the aperture and
   wherein the plurality of video camera simultaneously capture images of both the passenger vehicle interior and an area exterior of the vehicle such that images are captured in the area where traffic approaches and passes the vehicle.

2. A vehicular video recording system comprising:
   (a) a plurality of video cameras attached to a passenger vehicle, the vehicle having an exterior and an interior, a rearview mirror positioned interior the vehicles, each of the plurality of video cameras comprising:
      (1) a lens;
      (2) means for generating video signals representing an image received through the lens;
      (3) means for outputting video signals; wherein at least one video camera is positioned interiorly the vehicle and mounted to the rearview mirror such that the lens of the video camera forms a portion of the surface of the rearview mirror;
   (b) a video recorder located in a passenger vehicle interior, the recorder having a video input port;
   (c) means for connecting the means for outputting video signals of each of the plurality of video cameras to the video input port of the video recorder, the means for connecting comprising a selective video signal relay device comprising:
      (1) a plurality of input ports corresponding to the plurality of video cameras, each of the plurality of input ports electrically connected exclusively to the means for outputting video signals of a corresponding one of the plurality of video cameras;
      (2) an output port;
      (3) a switching port; and
      (4) means for selectively relaying video signals received by the means for receiving video signals to the output port in response to a switching signal received at the switching port.

3. A vehicular video recording system comprising:
   (a) a plurality of video cameras attached to a passenger vehicle, the vehicle having an exterior and an interior each of the plurality of video cameras comprising:
      (1) a lens;
      (2) means for generating video signals representing an image received through the lens;
      (3) means for outputting video signals;
   (b) a video recorder located in a passenger vehicle interior, the recorder having a video input port;
   (c) means for connecting the means for outputting video signals of each of the plurality of video cameras to the video input port of the video recorder, the means for connecting comprising a selective video signal relay device comprising:
      (1) means for receiving video signals;
      (2) an output port;
      (3) a switching port; and
      (4) means for selectively relaying video signals received by the means for receiving video signals to the output port in response to a switching signal received at the switching port; and
   wherein the selective video signal relay device functions conjointly with a flashing stop light system of the passenger vehicle.

4. A vehicular video recording system comprising:
   (a) a plurality of video cameras attached to a passenger vehicle, the vehicle having an exterior and an interior, a rearview mirror positioned interior the vehicle, the mirror having a front surface and a rear surface, each of the plurality of video cameras comprising:
      (1) a lens;
      (2) means for generating video signals representing an image received through the lens;
      (3) means for outputting video signals; wherein at least one video camera is positioned interiorly the vehicle and mounted to the rearview mirror such that the lens of the video camera forms a portion of the surface of the rearview mirror;
   (b) a video recorder located in a passenger vehicle interior, the recorder having a video input port;
   (c) means for connecting the means for outputting video signals of each of the plurality of video cameras to the video input port of the video recorder, the means for connecting comprising a selective video signal relay device comprising:
      (1) a plurality of input ports corresponding to the plurality of video cameras, each of the plurality of input ports electrically connected exclusively to the means for outputting video signals of a corresponding one of the plurality of video cameras;
      (2) an output port;
      (3) a switching port; and
      (4) means for selectively relaying video signals received by the means for receiving video signals to the output port in response to a switching signal received at the switching port; and
   wherein one of the plurality of video camera is mounted to the rearview mirror such that the lens of the one of the plurality of video cameras forms a portion of the front surface of the mirror.

* * * * *